Patented Dec. 14, 1926.

1,610,936

UNITED STATES PATENT OFFICE.

AUGUST DORRER, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY.

MANUFACTURE OF YELLOW AZO-DYESTUFFS.

No Drawing. Application filed November 20, 1925, Serial No. 70,408, and in Germany December 15, 1924.

I have found that by nitrating the monoazo-dyestuffs obtainable from naphthylamine mono-sulfonic acids and diphenylamine, yellow dyestuffs are obtained possessing an excellent affinity for wool and especially for silk, paper, and leather. The said azo dyestuffs may be transformed into N-nitroso-derivatives, or nitroso-amines, prior to nitration.

The new dyestuffs produced in accordance with my invention dye silk very satisfactorily in a slightly acidulated boiled-off liquor bath or in a bath containing soap and Glauber's salt, this property being especially desired by silk dyers; they are superior to the India yellow and the known azoflavines which are nitration products of the mono-azo dyestuffs obtained from sulfanilic acid and diphenylamine. Valuable shades are also obtained with these new dyestuffs on wool, paper and leather, especially on chrome tanned leather.

The following example will further illustrate how my invention may be carried into practical effect, but my invention is not restricted to this example. The parts are by weight.

*Example.*

22.3 parts of a technical mixture of beta-naphthalamine monosulfonic acids are diazotized in the usual manner and coupled with 16.9 parts of diphenylamine dissolved in alcohol. The dyestuff so prepared is filtered off and pressed, the press-cake is suspended in water and transformed into the nitroso-amine by means of 8.5 parts of sodium nitrite. The nitroso-amine corresponding to the formula

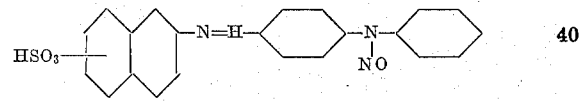

is nitrated by successively adding 46 parts of nitric acid of 65 per cent strength and 37 parts of 98 per cent sulfuric acid at 30 degrees to 35 degrees centigrade. The nitro derivative formed is salted out with common salt, filtered off, pressed and neutralized with sodium carbonate solution. The sodium salt is precipitated with common salt, filtered off and dried. It is probably a mixture of mono- and di-nitro-compounds one of which corresponds probably to the formula

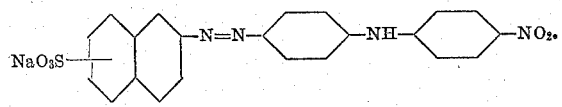

By varying the conditions of the nitration, more reddish or greenish yellow dyestuffs are obtained which all have the excellent properties mentioned above.

The process may be carried out in a similar manner when employing other naphthylamine sulfonic acids.

I claim:

1. The process of manufacturing yellow azo dyestuffs which consists in nitrating a mono azo dyestuff obtainable from a naphthylamine sulfonic acid and diphenylamine.

2. The process of manufacturing yellow azo dyestuffs which consists in converting the azo dyestuffs obtainable from a naphthylamine mono sulfonic acid and diphenylamine into a nitroso-amine derivative and nitrating the latter.

3. As new articles of manufacture nitrated azo dyestuffs derived from diazotized naphthylamine mono sulfonic acid and diphenylamine.

In testimony whereof I have hereunto set my hand.

AUGUST DORRER.